United States Patent [19]
Nicholson et al.

[11] 4,451,114
[45] May 29, 1984

[54] METHOD FOR RECORDING AND RECONSTRUCTING PULSE LASER HOLOGRAMS IN COLOR

[76] Inventors: Peter Nicholson; Kalina Nicholson, both of Flushing, N.Y.

[21] Appl. No.: 335,709

[22] Filed: Dec. 30, 1981

[51] Int. Cl.³ .............................................. G03H 1/26
[52] U.S. Cl. .............................. 350/3.75; 350/3.81; 350/3.85
[58] Field of Search .................. 350/3.81, 3.85, 3.86, 350/320, 3.67, 3.75, 3.77

[56] References Cited

U.S. PATENT DOCUMENTS

| | | |
|---|---|---|
| 3,532,406 | 10/1970 | Hartman . |
| 3,556,631 | 1/1971 | Cook . |
| 3,695,744 | 10/1972 | Clay . |
| 4,067,638 | 1/1978 | Yuno et al. . |
| 4,071,291 | 1/1978 | Suzuki et al. . |
| 4,235,505 | 11/1980 | Hariharan et al. . |

OTHER PUBLICATIONS

Caulfield, H. J., *Handbook of Optical Holography*, pp. 95–97, 199–204, 269–276, 456–457, and Chapter 17, Academic Press, 1979.

*Primary Examiner*—Bruce Y. Arnold
*Attorney, Agent, or Firm*—Brumbaugh, Graves, Donohue & Raymond

[57] ABSTRACT

A method for recording and reconstructing a hologram recorded with two pulse laser beams having different wavelengths in order to increase the illuminance of the reconstructed image recorded in one of said channels is disclosed. The method comprises the steps of generating a first reconstruction beam at a wavelength shifted from the wavelength of the recording beam having the lesser illuminance if the two recording beams had equal irradiance toward a direction of the other recording beam. The wavelength of the second reconstruction beam has a value shifted from its associated recording beam by an amount equal the value that said first reconstruction beam is shifted from its associated recording beam. The resultant reconstructed images from the two reconstruction beams are generally equal in size and are in co-registration. The amount of shift is chosen so that the reconstruction wavelengths have substantially equal illuminance for an equal amount of irradiation. The product obtained by the recording method is also disclosed.

13 Claims, 5 Drawing Figures

METHOD FOR RECORDING AND RECONSTRUCTING PULSE LASER HOLOGRAMS IN COLOR

TECHNICAL FIELD

The present invention relates to recording and reconstructing holograms made with pulse lasers, and more particularly to a method for recording and reconstructing pulse laser color holograms.

BACKGROUND OF THE INVENTION

Recent developments have been made in recording and reconstructing holographic images of live subject matter, especially human subjects. See, for example, U.S. patent application Ser. No. 323,950 filed Nov. 23, 1981 entitled "METHOD OF RECORDING HOLOGRAPHIC IMAGES IN WHITE LIGHT IMAGE PLANE HOLOGRAMS", and U.S. patent application Ser. No. 327,180 filed Dec. 3, 1981 entitled "APPARATUS AND METHOD FOR RECORDING HOLOGRAPHIC IMAGES OF HUMAN SUBJECTS", applied for in the name of Peter Nicholson. In accordance therewith, a technology has been created whereby recording in a single wavelength, usually 694 nanometers for a pulse ruby laser, can easily and safely be made by persons unfamiliar with the art and science of holography.

Color holographic recordings of diffusely illuminated objects have in the past been limited to continuous wave laser holography, since the power output of the laser need not be that great because the hologram is typically recorded over a long-time interval, e.g. 30 seconds. Therefore, any one of a large variety of suitable recording wavelengths of different colors are available for continuous wave laser holography. In continuous-wave laser color recording, the red channel is typically recorded with a helium neon (He—Ne) laser having a wavelength of 633 nanometers and the green and blue channels with an Argon laser having a number of available lines, usually 514 nanometers for the green and 488 nanometers for the blue. Alternatively, a helium cadmium laser with an emission line of 442 nanometers may be used for the blue line. The continuous-wave laser color hologram is then reconstructed with the same continuous wave lasers used in making the original recording.

However, while it is possible to record and reconstruct accurate color holograms using this continuous-wave laser process, it suffers from at least two major drawbacks that have severely limited its development and application. The first draback is the extremely high cost of the apparatus for both recording and reconstructing a holographic image. The second major drawback is that since a continuous wave laser is used (which due to its low output, requires the recording medium to be exposed over a long-time period, e.g. 30 seconds) the subject matter must of necessity be inert, i.e. not live subject matter.

Therefore, it would be particularly desirable to make color holograms of live subject matter, particularly portraits of human subjects. Also, it would be desirable to develop a method for reconstructing the recorded hologram with relatively inexpensive light sources.

SUMMARY OF THE INVENTION

At the present time, the choice of recording wavelengths for use in pulse laser holography is severely limited by the number of available lasing crystals. Presently, the preferred pulse laser source is a ruby laser having a wavelength of 694 nanometers. The only other practical wavelength in the visible region for pulse lasers is a frequency doubled neodymium YAG laser source having a wavelength of 532 nanometers, which is in the green visible region. Therefore, at the present time the available wavelengths for making two-channel color recordings using pulse lasers are 694 nonmeters and 532 nanometers.

When recording and reconstructing holograms, prime consideration must be given to the responsiveness of the human eye over the visible wavelength region. The human eye is responsive to a wavelength range of 400 to 700 nanometers, with a response peak at 555 nanometers. The response curve has a basically normal distribution. If the response peak at 555 nanometers is assigned a value of 1.0000, then the relative visibility at 694 nanometers (a ruby red laser) is 0.0052. Thus, a hologram reconstructed at 694 nanometers would require more than 200 times the irradiance than if it were reconstructed at 555 nanometers in order to obtain a similar illuminance.

In accordance with the present invention, a method is provided for reconstructing a hologram having at least two channels, i.e. recorded with at least two pulse laser beams having different wavelengths (e.g. 532 and 694 nanometers), wherein the wavelength of one of the beams has a lesser illuminance for an equal irradiance than the other recording beam, or one of the other recording beams. The reconstructing process comprises generating a first reconstruction beam at a wavelength shifted, from the wavelength of the recording beam having the lesser illuminance, in the spectral direction of the wavelength of the pulse laser having the greater or greatest illuminance for outputs of equal irradiance. The reconstruction beam for the 694 nanometer wavelength channel is preferably shifted downward to 640 nanometers. For reconstructing the second channel, a second reconstruction beam is generated at a wavelength shifted from the wavelength of the other, i.e. second recording beam in the same direction, and by substantially the same magnitude as the shift of the first reconstruction beam from its associated recording beam. Therefore, since the shift between the first recording and first reconstruction beam was from 694 to 640 nanometers, or a difference of 54, the amount of shift between the second recording and reconstruction wavelengths is also 54, i.e. from 532 to 478 nanometers. The amount of shift is preferably chosen so that the reconstructed images from the two channels, i.e. from the two reconstruction beams, are generally equal in size and are in co-registration.

Preferably, the hologram is recorded with the two reference beam sources placed in positions with respect to the recording medium so that crosstalk between the two channels is minimized. For example, an angle of 70° between the incident waves of the two pulse lasers has resulted in virtually no crosstalk. The reconstruction beams can be provided by inserting an interference filter having a bandwidth of approximately 10 nanometers centered at the reconstruction wavelength inserted in the path of a white light source such as a tight filament quartz lamp, whose output is approximately equal and uniform over the entire visible spectrum (400–700 nanometers).

Accordingly, the present invention provides a novel method for recording color holograms of live subject matter using at least pulse lasers and for reconstructing the holograms at two selected wavelengths to obtain images from the two channels which have generally equal illuminance of sufficient magnitude to be visible by the human eye. Also, the hologram is reconstructed with relatively inexpensive light sources.

Also, the present invention provides a hologram product produced by the method described above and in more detail below.

Numerous other advantages and features of the present invention will become readily apparent from the following detailed description of the method of the invention, from the claims and from the accompanying drawings.

BRIEF DESCRIPTION OF THE DRAWINGS

FIG. 2a is an elevated side view of the method for reconstructing the two-channel hologram made in accordance with the procedure illustrated in FIG. 1a;

DETAILED DESCRIPTION OF THE PREFERRED EMBODIMENT

Figure 1A:
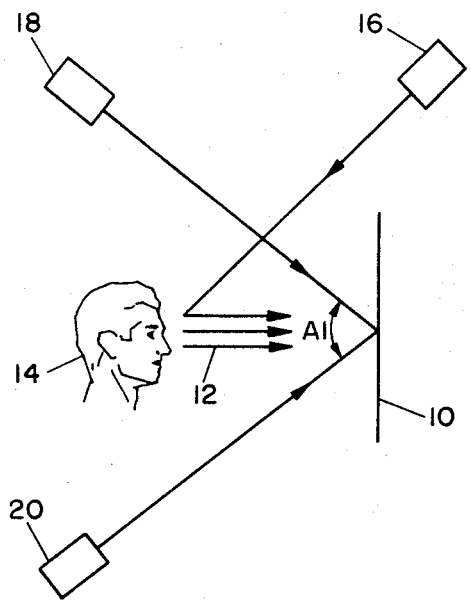
FIG. 1a is an elevated side view illustrating the process of recording a hologram with two differently colored pulse laser reference beams.

While this invention is susceptible of embodiment and practice in many different forms, there is shown in the drawings and will herein be described in detail one specific method and product, with the understanding that the present disclosure is to be considered as an exemplification of the principles of the invention and is not intended to limit the invention to the precise method or product illustrated.

Referring now to FIG. 1, a holographic recording material 10 is shown being exposed to object beam light 12 reflected off of a human subject 14 from an object beam source 16. Reference beam source 18 is a pulse red ruby laser having a wavelength of 694 nanometers. Reference beam source 20 is a frequency doubled neodymium YAG laser having a wavelength of 532 nanometers. The angle A1 between the two reference beams 18 and 20 is selected to reduce the crosstalk between the image recorded with reference beam 18 and reference beam 20. An angle of 70° has been found to virtually eliminate crosstalk. It should be understood that the object beam source 16 should have wavelength components the same as those of reference beam 18 and reference beam 20. Of course, as is well-known, the object beam source 16 can be provided by beam splitting a portion of the reference beam from reference beam source 18 and a portion of the beam from reference beam source 20 in a conventional manner.

Figure 1B:
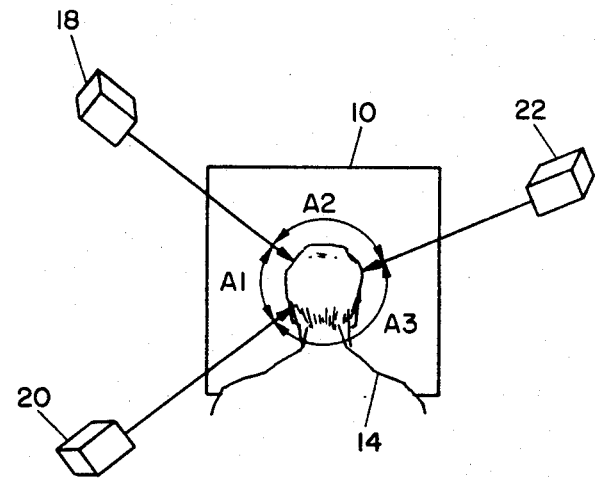
FIG. 1b is an elevated front view showing a method for producing a three-channel hologram with at least two different wavelengths pulse laser sources, but wherein the object beam is not shown.

FIG. 1b is a front elevational view also illustrating the recording of a multi-channel hologram, but wherein the object beam source is not shown, and wherein three reference beams 18, 20 and 22 are illustrated to produce a three-channel color hologram. Here the angles A1, A2 and A3 between reference beam sources 18, 20 and 22, taken two at a time, are chosen to minimize the crosstalk between the three channels being recorded.

As described above, the visual response of the human eye over the range of 400 nanometers to 700 nanometers resembles a normal distribution curve having a peak at 555 nanometers. If we assign a value of 1.0000 to the intensity at the response peak, then the relative visibility of the human eye at 694 nanometers is 0.0052. Thus, a hologram reconstructed at 694 nanometers would require more than 200 times the amount of irradiance than if it were reconstructed at 555 nanometers to have a similar illuminance. In accordance with the present invention, the hologram is reconstructed with reconstruction beams shifted from their recording beams by a generally equal and predetermined value. By using a reconstruction beam of 640 nanometers, an increase in visual response from 0.0052 relative visibility to 0.18 relative visibility (relative to the peak at 555 nanometers) is obtained. This is an increase in visual response of approximately 30 times.

However, a change in reconstruction wavelength creates also a change in the size and position of the reconstructed image. Shortening the wavelength of the reconstruction relative to recording beam will demagnify the image and bring it closer to the image plane. Therefore, in order to obtain registration between the two different channel recordings of the same object, it is necessary to shift the wavelengths of the two reconstruction beams by a generally equal amount. Therefore, to properly reconstruct the image recorded with a 532 nanometer wavelength source, the associated reconstruction beam must have a wavelength shifted by 54 nanometers to obtain a reconstruction wavelength of 532 nanometers.

Figure 2A:
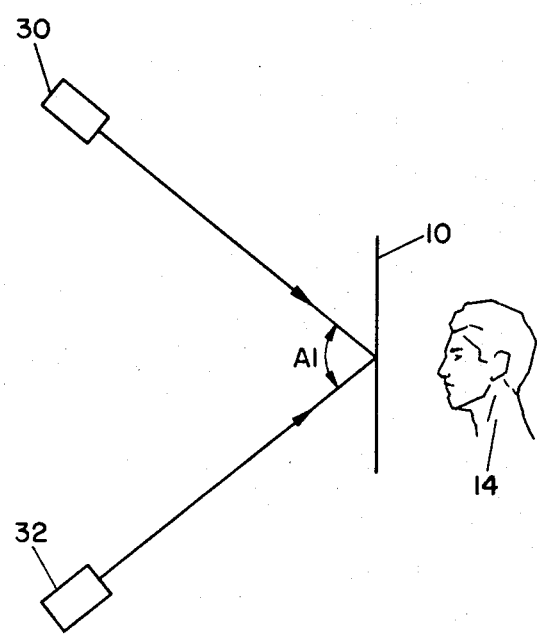
Figure 2B:
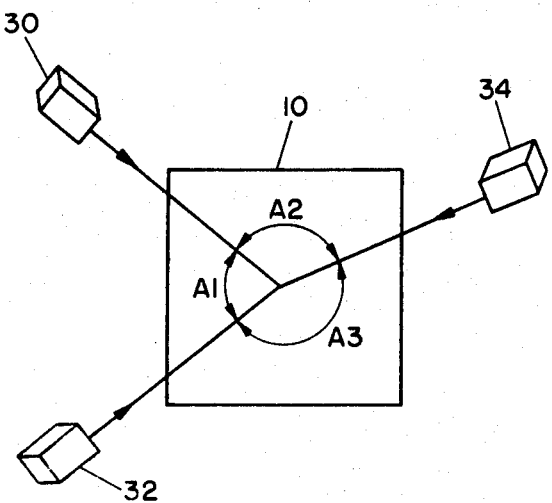
FIG. 2b is an elevational front view illustrating the method of reconstructing the three-channel hologram recorded by the procedure of FIG. 1b.

FIG. 2a illustrates the method for reconstructing the image recorded in a recording medium 10. The reconstruction beams 30 and 32 are positioned relative to each other so that the angle A1 between the two beams results in minimal crosstalk between the channels recorded in the hologram. If a three-channel hologram is being reconstructed as shown in FIG. 2b, the angles A1, A2 and A3 formed by taking pairs of the reconstruction beams 30, 32 and 34 are also chosen in order to minimize crosstalk between the three recorded channels. Experimentally, an angle of 70° has been found to virtually eliminate crosstalk. However, smaller angles may also solve the crosstalk problem.

Figure 3:
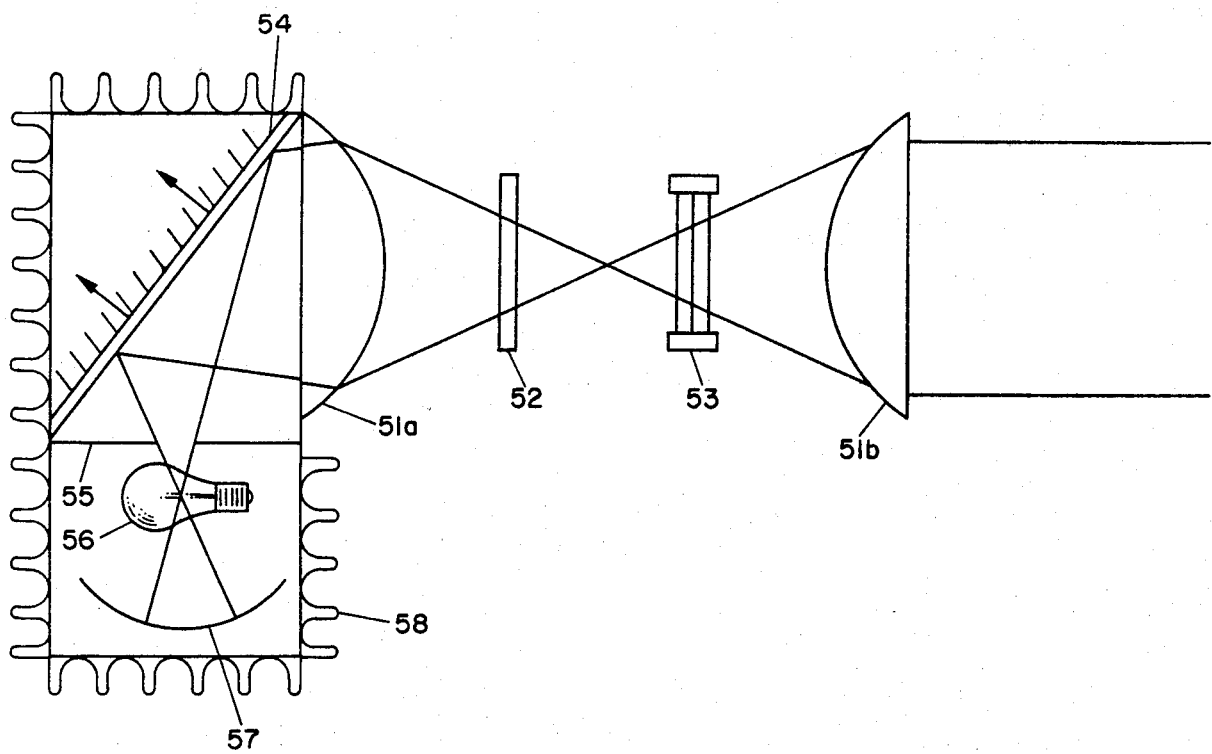
FIG. 3 is an elevational side view, in partial cross-section, of an illumination device for producing reconstruction beams of different wavelengths.

FIG. 3 illustrates an apparatus for generating a reconstruction beam at any desired wavelength. The illumination device comprises spheric condensor lenses 51a and 51b, heat filter 52 and a three-cavity interference filter 53 disposed to receive light from a quartz lamp 56. The quartz lamp 56 is disposed inside a heat sink arrangement. A cold mirror 54 reflects visible light, but passes infrared light which is incident at a 45° angle to the mirror. The energy from this absorbed light is absorbed by the heat sink material 58 surrounding the exterior of the apparatus as shown. A tight filament quartz lamp, which can be a G.E. 500 watt 120 V FBG lamp is disposed relative to radius mirror 57 and aperture and mask member 55 and cold mirror 54, so that visible light passes through a condensor lens 51a and heat filter 52. The three-cavity interference filter 53 preferably has a bandwidth of 10 to 20 nanometers which is centered on the desired reconstruction wavelength.

In practice it has been found that 10 nanometer wide interference filters centered on 640 nanometers and 480 nanometers respectively, give proper reconstruction of the recorded images while having almost identical visual response factors. By adjusting the position of the condenser lenses 51a and 51b relative to the lamp and filter, the intensity of each channel can be adjusted. Thus, the color hologram may be tuned up to give the most aesthetically pleasing color tones. It should be understood that any pair of filters may be used which provide the basic principle of maintaining the same wavelength shift or separation between the recording wavelength and reconstruction wavelength for each channel. Of course consideration should be given to the visual response of the human eye at that particular wavelength.

The quartz lamp has a generally equal output over the entire visible spectrum. Therefore, any discrete wavelength can be chosen as the center of the bandwidth of the interchangeable interference filter, unlike as heretofore, where a short arc high-pressure mercury vapor arc lamp was the preferred means of reconstruction (other than gas lasers). The mercury arc lamp has strong peaks in the green at 546 nanometers and the yellow at 577 nanometers, with minor lines in the red and the blue.

As discussed above, the amount of shift for such channel is substantially equal in order to obtain registration of the reconstructed images. The preferred value of the shift is chosen to be 54 nanometers downward in order to obtain substantially equal irradiance for the same amount of illumination. At 640 nanometers the relative visibility of the human eye relative to the peak at 555 nanometers is about 0.13. The relative visibility of the human eye at 478 nanometers is likewise about 0.13 relative to the peak at 555 nanometers. Also, another advantage of shifting from 532 nanometers to 478 nanometers is that while the 532 nanometer wavelength is primarily in the green region, the 478 nanometer wavelength is in the blue-green region. Therefore, upon reconstruction, a blue component of color can be obtained which was not previously had.

As discussed above, while the object beams may be a mixture of the two wavelengths used for the reference beams, two separate reference beams should cover the recording medium from two different directions in such a manner that two completely separate recordings are made at the same time and in such a way that crosstalk between the two channels is kept to a minimum at the reconstruction stage.

Experimentally it has been determined that a rotation of approximately 70° between the two reference beams facilitates a reasonably complete separation of channels from the viewing area. A third or fourth channel can of course be added by a simple 70° rotation from the first two channels. While at the present time, only ruby and neodynium YAG crystals generate sufficient power in a short enough time to record a live event, it is understood that any other recording wavelength may be used providing that the above-described angular relationship and wavelength shift is followed.

Additionally, while narrow color bands from a quartz lamp can be used for reconstruction of the individual holograms, it may be required to project or scan the real image of the hologram. The Argon laser at 488 nanometers or the Krypton laser at 649 nanometers is the best match where high power is required.

while true and accurate color reproduction should in theory have three channel recording and reconstruction, it has been found in practice that the vastly increased information in spatial cues inherent in a transmission portrait hologram added to the mixed color hues of superimposed reconstructions in the red and the blue give a most life-like and satisfying rendition of a human portrait. A further third channel can be added at the time of recording by introducing an extra reference beam derived from either of the two recording lasers from a direction different from either of the two recording lasers original channels. This third channel can be reconstructed with white light the intensity of which is varied to give the most pleasing effect or with a yellow-green broad band beam derived from a quartz lamp illuminator. This extra channel will, in fact, give an added spectrally dispersed image which has the affect of softening somewhat both the image and the colors, while simulating the missing green channel, thus giving enriched whites, yellows and greens. The white light source used to reconstruct the third channel can be unfiltered light from an illumination device similar to that of FIG. 3.

From the foregoing, it will be observed that numerous variations and modifications may be effected without departing from the true spirit and scope of the novel concept of the invention. It is to be understood that no limitation with respect to the specific method illustrated herein is intended or should be inferred. It is, of course, intended to cover by the appended claims all such modifications as fall within the scope of the claims.

What is claimed is:

1. A method for reconstructing a hologram which was recorded with at least two pulse laser beams having different wavelengths, said method serving to increase the illuminance of the image recorded in at least one of the recorded channels and comprising the steps of:

generating a first reconstruction beam at a wavelength which is shifted from the wavelength of the one recording beam which would have the lesser illuminance if the two recording beams had equal irradiance, wherein the wavelength shift is in the direction of the wavelength of the other recording beam;

generating a second reconstruction beam at a wavelength shifted, from the wavelength of the other recording beam, in the same spectral direction and by substantially the same number of wavelengths as the shift of the first reconstruction beam from the wavelength of said one recording beam; and directing said reconstructing beams at said hologram to obtain a reconstructed image, whereby the reconstructed images from the two reconstruction beams are generally equal in size and are in co-registration.

2. The method according to claim 1 wherein the hologram is recorded with two pulse lasers having wavelengths of about 694 nanometers and 532 nanometers.

3. The method according to claim 1 wherein the reconstruction beams have wavelengths of approximately 640 nanometers and 478 nanometers.

4. The method according to claim 1 wherein at least one of the reconstruction beams is generated by providing a light source having a substantially equal output over the visible wavelength region, and a bandpass filter whose bandwidth is about 10–20 nanometers and is centered at the wavelength of said one reconstruction beam.

5. The method according to claim 1 further including the step of adjusting the relative intensity of said reconstruction beams in order to obtain a reconstructed image having optimum color tones.

6. The method according to claim 5 wherein the step of adjusting the relative intensity of said reconstruction beams comprises the step of placing condenser lenses between at least one reconstruction beam source and the recorded hologram, and moving said lenses.

7. The method according to claim 1 wherein the amount of shift is such that the hologram illuminance when reconstructed with the first and second reconstruction beams is greater than that when reconstructed with beams having wavelengths substantially equal to the recording wavelengths.

8. The method according to claim 1 wherein the amount of shift is selected such that the wavelengths of the reconstruction beams have substantially equal relative visual response for the same beam irradiance.

9. The method according to claim 1 wherein the hologram is recorded with three reference beams and further including the step of:

generating a third reconstruction beam having generally a uniform spectral distribution.

10. The method according to claim 9 wherein the third reference beam has a wavelength component generally equal to the wavelength of at least one of the first two reference beams.

11. The method according to claim 9 further including the step of adjusting the intensity of the light of the third reconstruction beam in order to obtain an optimum reconstructed image.

12. The method according to claim 1 wherein the hologram contains images recorded by at least two reference beams whose paths intersect at the recording medium at an angle chosen to minimize crosstalk.

13. The method according to claim 12 wherein the angle is about 70°.

* * * * *